United States Patent [19]

Sonderegger

[11] Patent Number: 5,761,499
[45] Date of Patent: Jun. 2, 1998

[54] METHOD FOR MANAGING GLOBALLY DISTRIBUTED SOFTWARE COMPONENTS

[75] Inventor: Kelly Ervin Sonderegger, Orem, Utah

[73] Assignee: Novell, Inc., Orem, Utah

[21] Appl. No.: 576,647

[22] Filed: Dec. 21, 1995

Related U.S. Application Data

[60] Provisional application No. 60/000,200 Jun. 14, 1995, and 60/003,615 Sep. 12, 1995.

[51] Int. Cl.$^6$ .................................................... G06F 17/30
[52] U.S. Cl. ............................................ 395/610; 395/712
[58] Field of Search ............................ 395/601, 610, 395/614, 615, 712, 684, 680

[56] References Cited

U.S. PATENT DOCUMENTS

| | | | |
|---|---|---|---|
| 4,580,218 | 4/1986 | Raye | 395/601 |
| 5,265,250 | 11/1993 | Andrade et al. | 395/671 |
| 5,287,505 | 2/1994 | Calvert et al. | 395/610 |
| 5,341,478 | 8/1994 | Travis, Jr. et al. | 395/610 |
| 5,412,772 | 5/1995 | Monson | 345/335 |
| 5,550,976 | 8/1996 | Henderson et al. | 395/610 |
| 5,553,282 | 9/1996 | Parrish et al. | 395/610 |

FOREIGN PATENT DOCUMENTS 87107964.6  12/1987  European Pat. Off. .

OTHER PUBLICATIONS

"Distributed Object System Framework ORB", K. Seki et al., *NEC Research & Development 35, No. 3*, Jul. 1994, pp. 292–297.

"Executing C++ Programs in a Distributed Environment", C. Yang et al., *International Journal of Mini & Microcomputers 13, No. 3*, 1991, pp. 139–143.

"Get Ready For Web Objects", Steve G. Steinberg, *Wired*, Feb. 1996, pp. 104–107.

"Microsoft to Woo Internet Programmers: Gates to Disclose Strategy as Competition Grows", Don Clark, *The Wall Street Journal*, Thursday, Dec. 7, 1995, p. B4.

"The Lotus Notes™ Storage System", Kenneth Moore, *ACM Sigmod Record*, 24 2, 1995, pp. 427–428.

*Inside Ole* Second Edition, 1995, pp. 9–22, 33–35, 43–47, 58, 59, 65–73, 169–172, 226–237, 247, 268–274, 277–301, 328–338, 378–380, 616, 617, 667–669, 830–833, 879, 988, 989, 1126, 1127, 1145–1164.

*OLE 2 Programmer's Reference* vol. one, 1994, pp. 3–29.

*The Whole Internet User's Guide & Catalog*, Ed Krol, Apr. 1994, pp. 187–322.

*NetWare 4 For Professionals*, Bierer et al., 1993, pp. 255–342.

"Lotus's Open Messaging Interface", RELease 1.0, vol. 91, No. 9, p. 3 (5), Sep. 1991.

"Over in the Dos/Windows World," RELease 1.0, vol. 91, No. 8, p. 13, Aug. 1991.

*Primary Examiner*—Thomas G. Black
*Assistant Examiner*—Jack M. Choules
*Attorney, Agent, or Firm*—Computer Law

[57] ABSTRACT

A method and apparatus are disclosed for managing software components in a network of computers such as a local area network or the Internet. Each software component includes a binary object and at least one interface to the binary object. Suitable software components include OLE components. The network includes a registry file identifying currently registered components and their locations. The network also includes a component server computer on which unregistered components reside. A database associates software component identifiers with software component locators. Suitable databases include Novell NetWare Directory Services databases and Internet search engine databases. Database objects or entries representing unregistered components are found by a search based on the class identifier of a desired component. Software components found by the search are selected, transferred as needed, and then registered, thereby making them available to clients.

29 Claims, 5 Drawing Sheets

METHOD FOR MANAGING GLOBALLY DISTRIBUTED SOFTWARE COMPONENTS

RELATED APPLICATIONS

This application is based on commonly owned copending provisional patent applications Ser. No. 60/000,200 filed Jun. 14, 1995 and serial no. 60/003,615 filed Sep. 12, 1995, each of which is incorporated herein by reference.

FIELD OF THE INVENTION

The present invention relates to a computer-implemented method for managing software components in a computer network, and more particularly to a method for locating and registering COM or OLE software component binary objects and interfaces which reside on a local network or on the Internet.

TECHNICAL BACKGROUND OF THE INVENTION

Modern information technology provides a vast array of software items to meet many different needs. However, after a need is identified, the sheer volume of available technology makes locating suitable items difficult. Systems or the items they provide may duplicate the functionality of other systems or items. Different pieces of software often behave inconsistently. Accessing and using items is difficult because items are often available only through systems that are not compatible with the system on which the items would be used.

One approach to reducing these problems relies on a "Component Object Model" ("COM"). COM is described generally in *OLE 2 Programmer's Reference*, Volume One, ISBN 1-55615-628-6 ("OLE 2 Programmer"), pages 3–7, and in K. Brockschmidt, *Inside OLE*, second edition, ISBN 1-55615-843-2 ("Inside OLE"), pages 9–14.

COM defines "component objects" (also known herein as "software components") which encapsulate pieces of functionality and make them available for use by "clients." These pieces of functionality are termed "services," thereby making it logical to view the software component as a "server" or "server component." However, the word "server" is also used in terms such as "Internet server," "in-process server," "file server," and "component server computer." Terms other than "server" also vary in meaning according to their context. Those of skill in the art will determine the meaning in each instance according to the context.

At a minimum, each COM software component includes a binary object and at least one interface to the binary object. Clients determine what services are available from a software component, and what information those services require and produce, by investigating the component's interface(s). Both Inside OLE and OLE 2 Programmer describe component interfaces and tools for investigating such interfaces. See, without limitation, Inside OLE pages 14–22, 43–47, and 1145–1164.

The software component provides its services to clients by executing portions of the binary object on a computer and by communicating with the clients. Inside OLE and OLE 2 Programmer describe some of the many available binary objects and discuss the limitations on communication between specific software components and their clients. See, without limitation, OLE 2 Programmer at pages 5–29.

One well-known version of COM is "OLE." A wide variety of OLE software components, OLE controls, OLE automation objects, OLE automation controllers, OLE-enabled applications, and related tools are commercially available. A *Directory of OLE Components for Visual Development* is available from Fawcette Technical Publications of Palo Alto, Calif.

Unfortunately, OLE software components are accessible on a given computer only if they are registered in a "registry file" which has a very specific format. Examples of registry files and discussions of their format are given in Inside OLE at pages 58–59, 70–73, 169–172, 226–231, 268–269, 328, 378–380, 616–617, 667–669, 830–833, 879, 988–989, and 1126–1127.

Registry files provide important information about the software components that are known and thus available to COM clients. In particular, the registry file maps software component identifiers known as "CLSIDs" to the file system location of the identified server's binary object and to "type library" information about that server component's interface(s). CLSIDs are discussed at Inside OLE pages 65–72. Two OLE server components may be stored on the same disk, but if only one of the components is registered by virtue of an appropriate entry in the registry file of a computer, then only that registered component is visible to potential clients running on that computer.

Moreover, only one version of a given component is typically registered. For instance, Inside OLE uses separate registry files rather than one global registry file because several versions of components are used as examples. Inside OLE at page 59.

The information in a registry file may be made available to several computers which are connected to one local area network ("LAN") by placing the registry on the LAN's network file server. For instance, the registry file, like any other file, can be made accessible through a UNIX or a Windows NT file server. Several separate registry files may also be viewed by the client as if they were a single larger registry file. The contents of a registry file could therefore be shared among the several members of a workgroup, such as the members of a Microsoft Windows or Windows NT workgroup (MICROSOFT, WINDOWS, and NT are trademarks of Microsoft Corporation).

However, this server-centered approach has several drawbacks. It does not scale well beyond a single LAN, because user account information is needed for each additional server. A convention could be used to reduce the administrative burden associated with these additional user accounts, such as the "anonymous" user convention followed by many FTP sites. But access control, security, and licensing restrictions are sacrificed by such conventions.

If an OLE software component is registered, then clients can request services identified in the component's interfaces. Service requests often pass data from the client to the server component, and may result in error codes or other data which is passed from the server back to the client. The process of passing information between a registered server component and one of its clients is known as "marshalling." As explained in Inside OLE and OLE 2 Programmer, OLE provides "standard marshalling" which allows communication when the server component and its client share access to a common region of memory on a single computer. OLE also allows (but does not actually provide) "custom marshalling." For instance, one of skill in the art could implement custom marshalling which transmits function arguments and results across a LAN, thereby allowing a client to communicate across the LAN with a known server component. See, without limitation, Inside OLE at pages 33–35, 277–301, 329–338.

OLE provides limited support for technical measures which enforce licensing requirements. Inside OLE describes this support at pages 234–237, 247, and 269–274. The OLE approach to licensing has the drawback that license keys are permanently stored in an application. OLE licensing support is also currently limited to server components and clients which communicate through shared memory.

In short, OLE provides an opportunity to make individual pieces of software more reliable and more readily available. OLE encourages encapsulation and re-use of software routines, thereby decreasing program development and upgrade time. However, OLE components are available only if they are registered in a local registry file. This reliance on a local registry file unduly limits component availability and creates scaling problems if many computers need access to the registration information.

As noted, OLE registry files and OLE components may be stored on computers which are connected to a LAN. OLE clients may also reside on LANs. However, OLE does not take full advantage of the abilities of LAN administration tools. OLE sometimes provides opportunities for those of skill to implement features that take advantage of networking, such as custom marshalling features. More often, however, OLE assumes its environment will be a single isolated computer.

One LAN administration tool that OLE fails to utilize is a "directory services provider." Directory services providers vary but in general they help administer both the location of network resources and the rights of network users to use those resources. One well-known directory services provider includes NetWare Directory Services ("NDS") software commercially available from Novell, Inc. of Orem, Utah (NetWare Directory Services is a trademark of Novell, Inc.).

The directory services provider includes a schema. The schema includes a set of "attribute syntax" definitions, a set of "attribute" definitions, and a set of "database object class" (also known as "class") definitions. The NDS software and a default NDS schema are described in Bierer et al., *NetWare 4 for Professionals*, ISBN 1-56205-217-9 ("NetWare 4"), pages 255–342. The terms "attribute" and "property" are used interchangeably in NetWare 4 and herein, as are the terms "attribute syntax" and "property syntax."

Each attribute syntax in the schema is specified by an attribute syntax name and the kind and/or range of values that can be assigned to attributes of the given attribute syntax type. Attribute syntaxes include, without limitation, Case Exact String (case-sensitive string), Case Ignore List (case-insensitive string), E-Mail Address, Net Address (valid addresses include IPX and AppleTalk), Path, and Stream (to access data not stored directly in NDS database files). Attribute syntaxes correspond roughly to data types such as integer, float, string, file, stream, or Boolean in conventional programming languages.

Each attribute in the schema has certain information associated with it. Each attribute has an attribute name and an attribute syntax type. The attribute name identifies the attribute, while the attribute syntax limits the values that are assumed by the attribute. For instance, the default NDS schema includes an attribute of syntax type integer having the name "supported connections" which specifies the number of concurrent connections a file server allows.

Each attribute may also have associated with it any or all of the following flags: Non-removable, Hidden, Public Read, Read Only, Single-Valued, Sized, and String. The general meanings of these flags are familiar to those of skill in the art. If the Sized flag is set for a given attribute, then upper and lower bounds (possibly including No Limit) are imposed on values currently held by that attribute.

Each database object class in the schema also has certain information associated with it. Each class has a class name which identifies it, a set of super classes that identifies the other classes from which this class inherits attributes, and a set of containment classes that identifies the classes permitted to contain instances of this class.

Each database object class also has a container flag and an effective flag. The container flag indicates whether the class is a container class, that is, whether it is capable of containing instances of other classes. The effective flag indicates whether instances of the class can be defined. Non-effective classes are used only to define attributes that will be inherited by other classes, whereas effective classes are used to define inheritable attributes, to define instances, or to define both.

In addition, each database object class groups together certain attributes. The naming attributes of a class are those attributes that can be used to name instances of the class. The mandatory attributes of a class are those attributes that must exist in each valid instance of the class and/or become mandatory attributes of classes which inherit from the class. The optional attributes of a class are those attributes that may, but need not, exist in each valid instance of the class. Optional attributes of a parent class become optional attributes of a child class which inherits from the parent class, unless the attributes are mandatory in some other parent class from which the child inherits, in which case they are also mandatory in the child.

A database object is an instance of a database object class. Different database objects of the same class have the same mandatory attributes but may have different current values in their corresponding mandatory attributes. Different database objects of the same class may have different optional attributes, and/or different current values in their corresponding optional attributes.

The directory services provider also includes a directory services interface library which provides access to the schema and to a database. The schema is an API-extensible schema in that the attributes and object classes found in the schema can be altered through an Application Programmers' Interface ("API") without direct access to the source code that implements the schema. In some embodiments the directory services interface library includes tables or commands stored in a file which is read by the schema during its initialization and when database objects are created, thereby defining the available attributes and classes.

In addition or as an alternative, the directory services interface library includes a set of routines that are available to other code to access and modify the schema. One implementation of the directory services interface library includes an NWDSxxx() library that is commercially available from Novell, Inc. of Orem, Utah. The NWDSxxx() library is so named because the names of functions and data types defined in the library typically begin with "NWDS," an acronym for "NetWare Directory Services."

The database contains database objects that are defined according to the schema and the particulars of the network. These objects typically represent resources of the network. The database is a "hierarchical" database because the objects in the database are connected in a hierarchical tree structure. Objects in the tree that can contain other objects are called "container objects" and must be instances of a container object class.

The database is also a "synchronized-partition" database. The database is typically divided into two or more nonoverlapping partitions. To improve the response time to database queries and to provide fault-tolerance, a replica of each partition is physically stored on one or more file servers in the network. The replicas of a given partition are regularly updated by the directory services provider through an automated synchronization process, thereby reducing the differences between replicas caused by activity on the network.

Other network administration tools which OLE fails to utilize are NWAdmin and its possible "snap-in" modules. The descriptions of these tools in commonly owned copending application Ser. No. 08/499,711, filed Jul. 7, 1995 are incorporated herein by reference.

OLE also fails to utilize the Internet, and the Internet is not presently configured to take full advantage of OLE. The Internet provides many different types of communication between an enormous number of computers around the world. As used herein, "Internet server" refers to any computer that is identified by an Internet address. Internet addresses are discussed in E. Krol, *The Whole Internet: User's Guide and Catalog*, second edition, ISBN 1-56592-063-5 ("Internet Guide"), pages 23–34.

Search and information management software helps manage the vast amount of information available from Internet servers. Internet servers may be further described according to the particular search and information management services they provide. For instance, "Archie servers," "Gopher servers," "WAIS servers," and "World Wide Web servers" all support software for indexing and/or locating files. Software such as "whois," "finger," and X.500directory services manage personal data for Internet users, such as their affiliation, e-mail address, regular mail address, and telephone number. See Internet Guide, pages 187–323.

The typical approach to locating and running executable code using the Internet begins when a user browses through menus, directory listings, or "readme" files using an Internet server. The user selects a file that has an interesting name or description. Typically the file contains a stand-alone program such as those found in .EXE, .COM, or .BAT files on DOS-compatible systems. The user then invokes FTP or another file copying service to copy the executable file to the user's local computer. Finally, the user launches or invokes the executable file.

A variation on this approach occurs with Java files (JAVA is a trademark of Sun Microsystems, Inc.). Java is an interpreted programming language designed for writing miniature application programs, called "applets," that are executed while users view World Wide Web pages. Applets are linked or included in World Wide Web pages much as images and links to other pages are included. When a user selects the highlighted or underlined portion of the Web page that corresponds to the applet, the applet is transferred across the Internet to the user's Web browser. If the Web browser contains no Java interpreter, an error occurs. But if the browser contains an interpreter, it "interprets" the applet by translating it one piece at a time into binary, executing the resulting binary code, translating the next piece, and so on. Applets do not conform with COM, because they do not provide binary objects or support COM interface management services.

Thus, it would be an advancement in the art to provide a novel method for managing COM software components which are distributed in a computer network.

It would be an additional advancement to provide such a method which takes advantage of the capabilities of directory services providers.

It would also be an advancement to provide such a method which takes advantage of the capabilities of Internet servers.

Such a method for managing software components is disclosed and claimed herein.

BRIEF SUMMARY OF THE INVENTION

The present invention provides an approach for managing COM software components in a network of computers. The network may be a local area network, a wide area network, the Internet, another network known in the art, or some combination thereof. The network serves as a repository for the software components. Under previous approaches, the repository of components that could be reached by a COM client was essentially limited to the presently registered components. Under the present invention, however, the repository expands to include not only previously registered components but also unregistered components that are identified in an arbitrarily large database.

Each software component includes a binary object and at least one interface to the binary object. Components may also include reference counts and other features. Suitable software components include, without limitation, OLE components.

COM clients only recognize registered components. The network includes at least one registry computer on which a registry file resides. The registry file entries identify the registered components and specify their locations. Suitable registry files include, without limitation, OLE registry files.

The network also includes at least one component server computer that is distinct from the registry computer. As yet unregistered components reside on the component server computer. Suitable component servers include Novell NetWare and other file servers, as well as Internet servers such as Gopher, Archie, Wide Area Information Service ("WAIS"), and Web servers.

A method of the present invention includes the following computer-implemented steps. A database which associates software component identifiers with software component locators is accessed to find locators, if any, which match a given identifier. Suitable databases include a hierarchical synchronized-partition database maintained by a network operating system, such as a Novell NetWare Directory Services ("NDS") database. NDS databases may be extended according to the present invention to include component database objects which have identifier, binary locator, licensing, and other suitable attributes. Other suitable databases include those maintained by Internet search engines such as Gopher, Archie, WAIS, or Web browsers.

If any matches are found during the database search, one or more of the software components identified by the search are selected. The location of the selected software component is extracted from the database. If necessary, part or all of the component is transferred so that the client can access it through the file system. Partial transfers include the transfer of one or more interfaces of the component, while total transfers include all interfaces and the binary object of the component. Finally, the registry file is updated to include the location of the selected component.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the Figures wherein like parts are referred to by like numerals. The present invention relates to a method and apparatus for managing software components in a computer network, and more particularly to a method for locating and registering COM or OLE software components which reside on a local area network or on the Internet network. The computers on the network may be workstations, laptop computers, disconnectable mobile computers, file servers, or a combination thereof. The network may include one or more LANs, wide-area networks, Internet servers, Internet clients, or a combination thereof.

Figure 1:
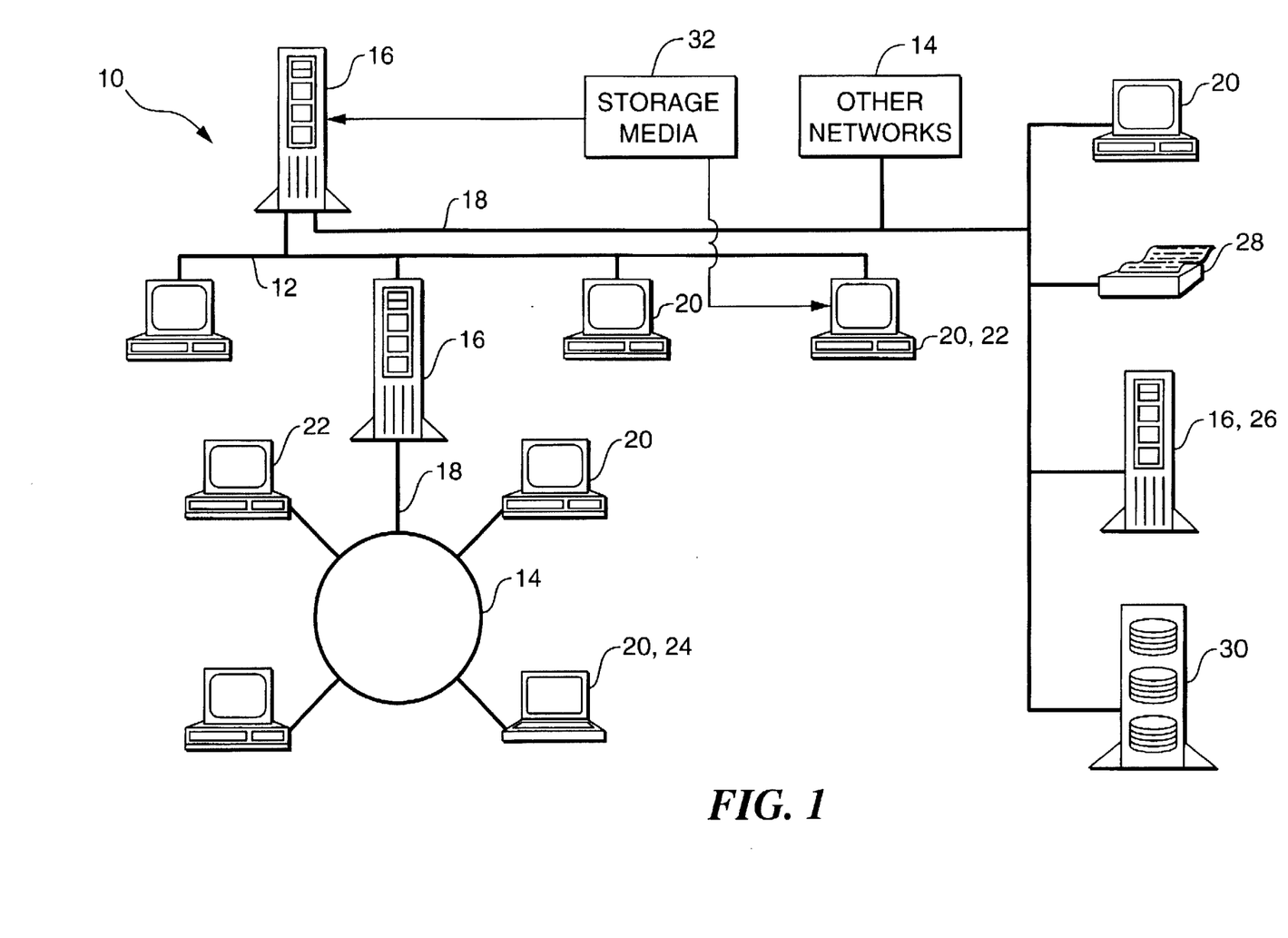
FIG. 1 is a schematic illustration of a computer network suitable for use with the present invention.

One of the many computer networks suited for use with the present invention is indicated generally at 10 in FIG. 1. In one embodiment, the network 10 includes Novell NetWare® network operating system software, version 4.x (NetWare is a registered trademark of Novell, Inc.). In alternative embodiments, the network includes NetWare Connect Services, VINES, Windows NT, LAN Manager, or LANtastic network operating system software (VINES is a trademark of Banyan Systems; NT and LAN Manager are trademarks of Microsoft Corporation; LANtastic is a trademark of Artisoft). The network 10 may include a local area network 12 which is connectable to other networks 14, including other LANs or portions of the Internet, through a gateway or similar mechanism.

The network 10 includes several file servers 16 that are connected by network signal lines 18 to one or more network clients 20. The file servers 16 and network clients may be configured by those of skill in the art in a wide variety of ways to operate according to the present invention. The file servers 16 may be configured as Internet servers, as directory services providers, as software component servers, or a combination thereof. The file servers 16, the network clients 20, or both may hold OLE registry files and either or both may act as OLE clients.

The network clients 20 include personal computers 22, laptops 24, and workstations 26. The signal lines 18 may include twisted pair, coaxial, or optical fiber cables, telephone lines, satellites, microwave relays, modulated AC power lines, and other data transmission means known to those of skill in the art. In addition to the network client computers 20, a printer 28 and an array of disks 30 are also attached to the network 10. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform distributed software component management steps of the present invention substantially as described herein.

Figure 2:
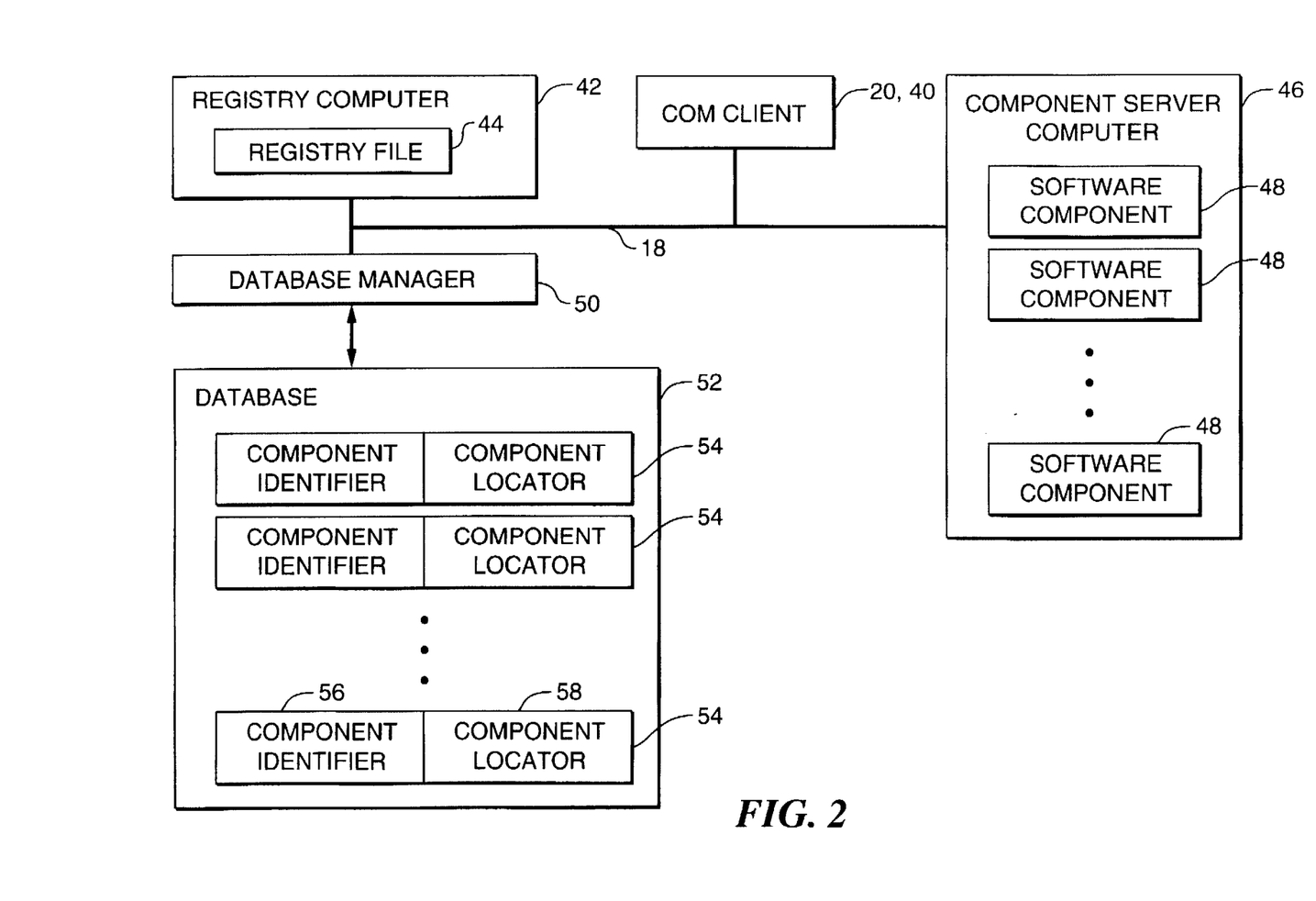
FIG. 2 is a diagram illustrating relationships between a software component client, a software component server computer, a registry, and a database according to the present invention.

FIG. 2 illustrates a network configuration in which a network client 20 acts as a COM client 40. That is, some piece of COM-aware software running on the client 40 has identified a particular COM software component whose services may be investigated and possibly used. In OLE embodiments of COM, the desired software component is typically identified by an OLE class identifier or CLSID. However, the desired software component may also be identified by a globally unique identifier ("GUID"), a universally unique identifier ("UUID"), or other means equivalent to a CLSID.

The COM client 40 is connected by the network signal means 18 to a registry computer 42. Alternatively, the client 40 and the registry computer 42 may be the same computer. A COM registry file 44 resides on the registry computer 42. Suitable registry files 44 include OLE registry files, as described in OLE 2 Programmer and Inside OLE. As used herein, a file or a software component "resides on" a given computer if the file or component, respectively, is accessible to another computer on the network through the given computer. For instance, files which are managed by a conventional file server such as a NetWare file server reside on that file server.

A component server computer 46 is also connected to the network by the signal means 18. One or more COM software components 48 reside on the component server 46. As noted, only registered software components are available to COM clients. Thus, any of the components 48 which do not appear in the registry file 44 are not available to the COM client 40, even if the client 40 has access through the network to the files that contain the components 48.

The signal means 18 also connects a database manager 50 to the network. The database manager 50 manages a database 52 which contains one or more database objects or entries 54. As used herein, "database object" refers to a specific kind of "database entry." Each database object or entry 54 associates a component identifier 56 with a component locator 58. In one embodiment, the database manager 50 comprises Novell NDS software and the database 52 comprises an NDS database. In other embodiments, the database manager 50 comprises Internet server software such as search engines and the database 52 comprises one or more Archie file indexes, Gopher indexed directories, WAIS document indexes, Hypertext Markup Language ("HTML") documents, Universal Resource Locator ("URL") documents, or World Wide Web pages.

Figure 3:
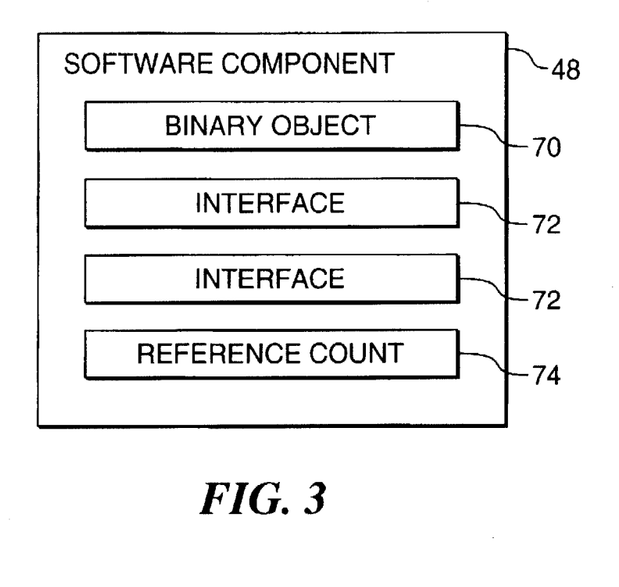
FIG. 3 is a diagram illustrating a software component suitable for use with the present invention.

FIG. 3 further illustrates an embodiment of one software component 48. The component 48 includes a binary object 70. Unlike interpreted code, binary code needs no translation before it will execute. Binary objects are also known as "native code objects." On DOS-compatible systems, suitable binary objects 70 include, without limitation, files in the well-known .EXE and .DLL formats.

The component 48 also includes one or more interfaces 72 to the binary object 70. Two important advantages of COM are the support it provides for dynamic ("run-time") determinations of whether a particular service is available, and the ability to substitute an expanded, improved, or alternate binary object for the current binary object 70 without requiring recompilation of the client 40 that uses the binary object 70. These advantages are achieved in large part by COM interface management services.

COM interface management services allow clients to dynamically query the component 48 to determine what services are available. The interface management services also provide a separating level of indirection between the client 40 and the binary object 70. Accordingly, suitable interfaces 72 include those which support COM interface management services. In one embodiment, the COM interface management services those provided through IUnknown, IClassFactory, ICreateTypeLib, and related OLE interfaces and their equivalents as described in OLE 2 Programmer and Inside OLE.

The illustrated component 48 also includes a reference count 74. Some alternative embodiments omit the reference count 74, while other embodiments include one or more of the following elements: memory management services, error reporting services, inter-process communication services, class factories, and specific implementation selection services. Suitable elements include those described in OLE 2 Programmer and Inside OLE.

Figure 4:
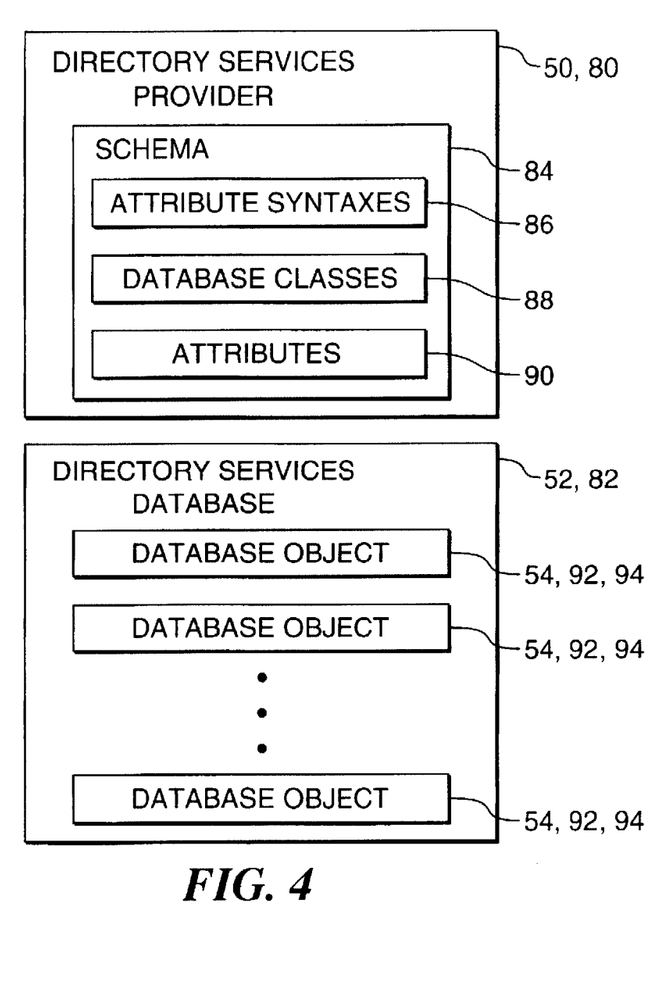
FIG. 4 is a diagram illustrating a directory services provider and database.

FIG. 4 further illustrates an embodiment of the database manager 50 and the database 52. The database manager 50 comprises a directory services provider 80 and the database 52 comprises a hierarchical synchronized-partition database 82 that is maintained by a network operating system. One suitable database 82 comprises an NDS database. One suitable directory services provider 80 comprises Novell NDS software maintained by the NetWare network operating system. NDS provides a schema 84 that contains definitions of attribute syntaxes 86, database classes 88, and attributes 90. One embodiment utilizes the existing NDS schema 84 and simply interprets database values according to the present invention.

As illustrated in FIGS. 2 and 4-6, alternative embodiments according to the present invention extend the NDS schema by defining component database objects such as the objects 92, 94. Each embodiment associates component identifiers 56 with component locators 58 by placing an identifier attribute 96 and a binary locator attribute 98 or 100 in an NDS database object 92 or 94, respectively. In each case, the identifier attribute 96 contains an OLE CLSID. Either or both type of database object 92, 94 may be utilized in a given database 82.

Figure 5:
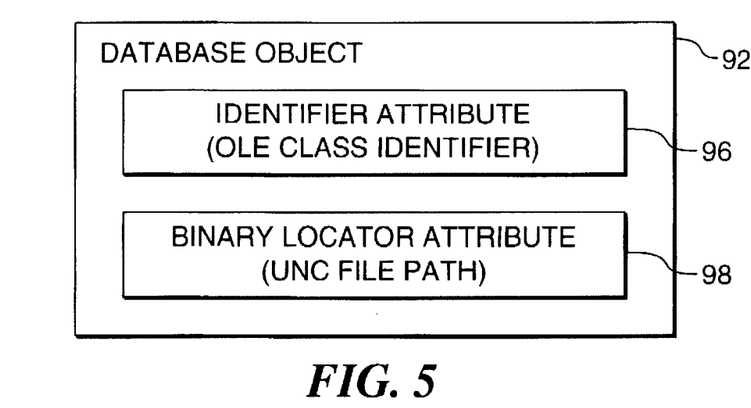
FIG. 5 is a diagram illustrating one embodiment of a component database object according to the present invention.

In the embodiment shown in FIG. 5, the binary locator attribute 98 has a universal naming convention file name as its value. The file name identifies the file system location of the file that contains the binary object 70 (FIG. 3) of the software component 48 that is identified by the OLE CLSID in the identifier attribute 96 of the database object 92.

Figure 6:
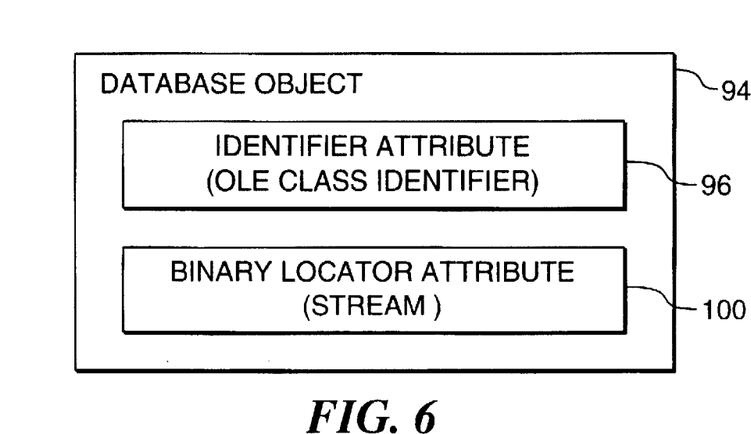
FIG. 6 is a diagram illustrating an alternative embodiment of a component database object according to the present invention.

In the embodiment shown in FIG. 6, the binary locator attribute 100 has a stream as its value. The stream provides direct access to the binary object 70 (FIG. 3) of the software component 48 that is identified by the OLE CLSID in the identifier attribute 96 of the database object 94. In alternative embodiments of the present invention, the database objects 92, 94 also contain OLE descriptor attributes, licensing attributes, attributes which store information that is found in OLE registry files, attributes which store information that is useful in managing NDS databases, or a combination thereof.

Figure 7:
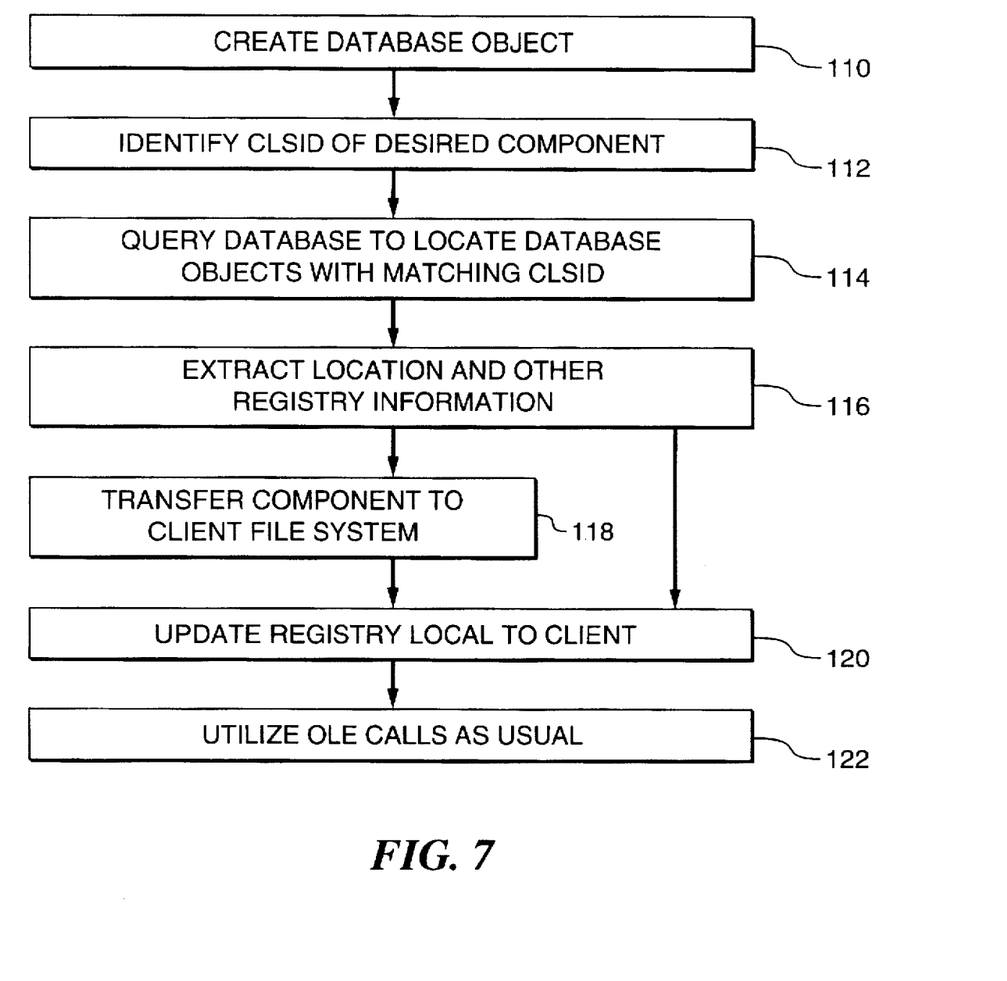
FIG. 7 is a flowchart illustrating a method of the present invention.

FIGS. 4 and 7 illustrate one method according to the present invention. During a creating step 110, a database entry or object 54 is created. Suitable database entries and objects 54 associate COM software component identifiers 56 with COM software component locators 58, as illustrated in FIGS. 2 and 4-6. In embodiments which comprise NDS database objects such as the objects 92 or 94, those of skill in the art will readily create such objects through appropriate calls to commercially available NWDSxxx() functions and other well-known means. In embodiments utilizing HTML documents, one suitable database entry 54 includes a keyword followed by a CLSID and Universal Naming Convention ("UNC") path in the document text, as in: "OLE-CLASS-ID 42754580-16b7-11ce-80eb-00aa003d7352//srv/v1/ole/foo.dll". In some embodiments, conventions regarding names and locations are followed and the UNC path is omitted.

With reference to FIGS. 2 and 7, during an identifying step 112 the COM client 40 identifies a specific desired COM software component and checks the local registry file 44 to see if the desired component is available. The desired component is identified by its CLSID, GUID, UUID, or an equivalent component identifier or class identifier. If the desired component is registered, steps 114 through 120 are skipped.

If the desired component is not registered, conventional COM systems (including conventional OLE systems) return an error message. This occurs even if a file containing the desired component resides on the same computer as the COM client. In one embodiment, a human user directly initiates steps 114-120 in response to the error message.

In a preferred alternative embodiment, OLE is extended so that at least a portion of steps 114-120 is performed automatically by extended OLE software if the desired component is not yet registered. This may be accomplished in various ways. One approach renames the existing OLE32.DLL as MSOLE32.DLL and provides a new OLE32.DLL. The new OLE32.DLL sends most function calls straight through to MSOLE32.DLL. However, the function CoGetClassObject() is altered to search the directory services and/or Internet database 52 if the desired component is not registered. If the search is successful, the altered CoGetClassObject() transfers the located component as needed, updates the registry file 44, and then passes control to the original CoGetClassObject() code.

The present invention extends the reach of the registry file 44 beyond a single computer or file system to a surrounding LAN, NetWare Connect Services network, and/or the Internet. If the desired component is not registered, a querying step 114 queries the database manager 50. Alternatively, software performing the querying step 114 may access the database 52 directly.

In either embodiment, the querying step 114 includes accessing the database 52 and searching it to locate any entries 54 which contain the desired component's CLSID or other identifier. The database search may be performed by NDS software, or it may be performed by Internet search engines such as Gopher, Archie, WAIS, or a World Wide Web browser. In some embodiments, both NDS and Internet searches may be performed. If no database entry or object 54 corresponding to the specified COM component identifier is located by the search, the COM client 40 is informed. The client 40 must then proceed as best it can without the desired services.

However, if search succeeds, one or more database entries or objects 54 containing the desired component identifier are selected. The associated location of the desired component's binary object 70 (FIG. 3) is determined by extracting it from the database entry or object 54 during an extracting step 116. Extraction is accomplished by means familiar to those of skill in the art.

The extracting step 116 may include extraction of licensing information, such as the value of a licensing attribute kept in a component database object 92 or 94. Steps may then be performed to ensure that licensing requirements will be met. Depending on the circumstances, suitable steps include offering the user a license agreement, initiating usage metering, debiting an existing account, or taking other steps familiar to those of skill in the art of licensing software.

During a transferring step 118, any necessary transfer of the desired component over the network to make it reside on the COM client 40 is performed. If the desired component already resides on the COM client 40 (but was unavailable due to lack of registration), no transfer is made.

A portion of the transferring step 118 varies according to the details of the database object 54 used. Streams such as those specified in the binary locator attribute 100 (FIG. 6) are opened as streams, a temporary file residing on the COM client 40 is created, and the stream data is transferred over the network into the temporary file. Files specified in the binary locator attribute 98 (FIG. 5) are copied or moved, as the user specifies, with copying being the preferable default.

During an updating step 120, the registry file 44 that resides on the COM client 40 is updated to reflect the new availability of the desired software component. In some embodiments, a predetermined ProgID or other key value is included in the registry entry to permit easy identification of entries made according to the present invention. This key value facilitates removal of such entries, as well as making it easy for system administrators to obtain statistics regarding use of the present invention.

Finally, during a utilizing step 122, the registry information and then the desired software component itself are utilized by the COM client. This is accomplished in a manner well-known in the art.

In summary, the present invention provides a novel approach which effectively extends the scope of COM software component repositories beyond a local computer or file system to the networks that communicate with the local computer. These communicating networks may be other local area networks, wide area networks, or even the worldwide Internet. Widespread use of software components, subject to appropriate licensing and security restrictions, is thereby promoted. Embodiments of the present invention are fully compatible with existing OLE registry files, and they eliminate the need for ad hoc approaches that require multiple (possibly inconsistent) copies of registry files or fail to scale well to many LANs.

All descriptions identified herein by citing specific topics or pages in OLE 2 Programmer, Inside OLE, NetWare 4, and/or Internet Guide are incorporated herein by reference. In the event of a conflict, descriptions provided directly herein take precedence over those incorporated by reference.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for managing software components in a network of computers, each software component including a binary object and at least one interface to the binary object, the network including at least one registry computer on which a registry file resides, the network also including at least one component server computer distinct from the registry computer, said method comprising the computer-implemented steps of:

accessing a database which associates software component identifiers with software component locators;

selecting a software component which is identified in the database as a result of said accessing step;

determining an initial location of the software component selected during said selecting step; and updating the registry file to include a current location of the selected software component.

2. The method of claim 1, wherein the software component selected during said selecting step includes a reference count to allow simultaneous use of the component by multiple clients and to determine when the component can be safely destroyed.

3. The method of claim 1, wherein the software component selected during said selecting step comprises an OLE software component.

4. The method of claim 1, wherein said accessing step comprises accessing a hierarchical synchronized-partition database maintained by a network operating system.

5. The method of claim 4, wherein said accessing step further comprises reading an identifier attribute value and reading a binary locator attribute value.

6. The method of claim 5, wherein the identifier attribute value corresponds to an OLE class identifier and the binary locator attribute value corresponds to a universal naming convention file path.

7. The method of claim 5, wherein the identifier attribute value corresponds to an OLE class identifier and the binary attribute value corresponds to a stream containing an OLE binary object.

8. The method of claim 1, wherein said accessing step comprises accessing a NetWare Directory Services database.

9. The method of claim 1, wherein said selecting step comprises selecting a software component that resides on an Internet server.

10. The method of claim 1, wherein said selecting step comprises selecting a software component that resides on a World Wide Web server.

11. The method of claim 1, wherein said selecting step comprises selecting a software component that resides on an Archie server.

12. The method of claim 1, wherein said selecting step comprises selecting a software component that resides on a Wide Area Information Service server.

13. The method of claim 1, wherein said updating step is preceded by the step of transferring at least a portion of the selected software component over the network to a client computer.

14. The method of claim 13, wherein said transferring step comprises transferring from a location specified by a hypertext markup language link.

15. The method of claim 13, wherein said transferring step comprises transferring from a location specified by a Universal Resource Locator.

16. The method of claim 13, wherein said transferring step comprises transferring at least one interface of the software component over the network.

17. The method of claim 13, wherein said transferring step comprises transferring the binary object of the software component over the network.

18. A method for managing OLE software components in a network of computers, each OLE software component including a binary object and at least one interface to the binary object, the network including at least one registry computer on which a registry file resides, the network also including at least one OLE component server computer distinct from the registry computer, said method comprising the computer-implemented steps of:

accessing a database which associates OLE software component identifiers with OLE software component locators, the database being a hierarchical synchronized-partition database maintained by a network operating system;

reading a binary locator attribute value from the database to determine an initial location of an OLE software component; and updating the registry file to include a current location of the OLE software component.

19. The method of claim 18, wherein the binary locator attribute value corresponds to a universal naming convention file path.

20. The method of claim 18, wherein the binary attribute value corresponds to a stream containing an OLE binary object.

21. The method of claim 18, wherein said accessing step comprises accessing a NetWare Directory Services database.

22. The method of claim 18, wherein said reading step is followed, and said updating step is preceded, by the step of transferring at least a portion of an OLE software component over the network to a client computer from a location specified by the binary locator attribute value.

23. A method for managing OLE software components on the Internet, each OLE software component including a binary object and at least one interface to the binary object, a registry file residing on at least one registry computer, at least one OLE component server computer on the Internet being distinct from the registry computer, said method comprising the computer-implemented steps of:

accessing an Internet search engine database which associates OLE software component identifiers with OLE software component locators;

selecting an OLE software component which is identified in the database as a result of said accessing step; and updating the registry file to include a current location of the selected OLE software component.

24. The method of claim 23, wherein said selecting step comprises selecting an OLE software component that resides on a World Wide Web server.

25. The method of claim 23, wherein said selecting step comprises selecting an OLE software component that resides on an Archie server.

26. The method of claim 23, wherein said selecting step comprises selecting an OLE software component that resides on a Wide Area Information Service server.

27. The method of claim 23, wherein said selecting step is followed, and said updating step is preceded, by the step of transferring at least a portion of the selected OLE software component over the Internet to a client computer.

28. The method of claim 27, wherein said transferring step comprises transferring from a location specified by a hypertext markup language link.

29. The method of claim 27, wherein said transferring step comprises transferring from a location specified by a Universal Resource Locator.

* * * * *